United States Patent [19]
Constant et al.

[11] Patent Number: 5,792,962
[45] Date of Patent: Aug. 11, 1998

[54] DEVICE AND METHOD FOR MEASURING VELOCITY PROFILES IN A MULTIPHASE FLUID

[75] Inventors: Michel Constant, Saint Denis; Jean-Pierre Reminieras, Tours, both of France

[73] Assignee: Institut Francais Du Petrole, Rueil Malmaison, France

[21] Appl. No.: 477,624

[22] Filed: Jun. 7, 1995

[30] Foreign Application Priority Data

Jul. 5, 1994 [FR] France .................. 94 08380

[51] Int. Cl.$^6$ .................................. G01F 1/66
[52] U.S. Cl. .................... 73/861.04; 73/861
[58] Field of Search ............ 73/861.04, 861.05, 73/861.06, 861.26, 195, 861.25

[56] References Cited

U.S. PATENT DOCUMENTS

| | | | |
|---|---|---|---|
| 4,236,406 | 12/1980 | Reed et al. | 73/861.04 |
| 4,402,230 | 9/1983 | Raptis . | |
| 4,532,812 | 8/1985 | Birchak | 73/861.04 |
| 4,884,457 | 12/1989 | Hatton | 73/861.04 |
| 4,976,154 | 12/1990 | Schneider et al. | 73/861.06 |
| 5,049,823 | 9/1991 | Castel et al. | 73/61.58 |
| 5,150,061 | 9/1992 | Castel et al. | 324/640 |

FOREIGN PATENT DOCUMENTS

| | | | |
|---|---|---|---|
| 0 161 956 | 11/1985 | European Pat. Off. . | |
| 40 25 952 | 7/1991 | Germany . | |
| 52-45983 | 4/1977 | Japan | 73/861.25 |
| 56-138216 | 1/1981 | Japan | 73/861.04 |
| 93 19347 | 9/1993 | WIPO . | |

OTHER PUBLICATIONS

Karplus, H.B. and A.C. Raptis, Flow measurement of dense slurries using the sonic doppler principle, Sep. 1978 Ultrasonics Symposium Proc., Cherry Hill, N.J., USA.

*Primary Examiner*—Ronald L. Biegel
*Attorney, Agent, or Firm*—Antonelli, Terry, Stout, & Kraus, LLP

[57] ABSTRACT

A method for measuring the velocity of at least a liquid phase and at least a gas phase of a multiphase medium flowing in a volume is disclosed. A first wave is transmitted at a given frequency f1 selected as a function of the liquid phase through at least part of the multiphase medium. At least one parameter, characteristic of a part of the first wave which is disturbed and diffused by the flowing medium is measured. A second wave is transmitted at a given frequency f2 selected as a function of the liquid phase through at least part of the multiphase medium. At least one parameter, characteristic of a part of the second wave which is disturbed and diffused by the flowing medium is measured. At least one measured parameter is processed using the Doppler effect. A velocity field of the liquid phase and/or the gas phase is determined for a given section of the volume in response to the processed at least one parameter.

15 Claims, 2 Drawing Sheets

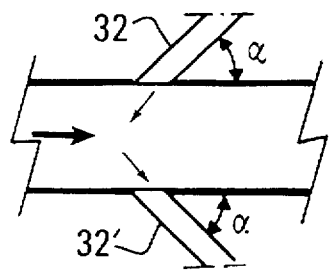
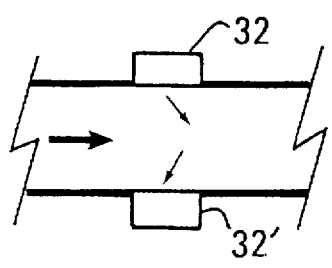
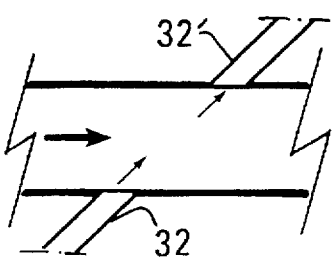
FIG.2A    FIG.2B    FIG.2C
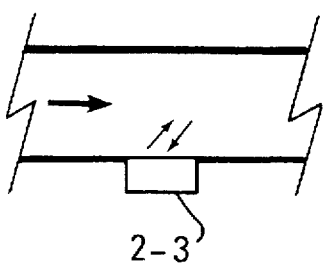
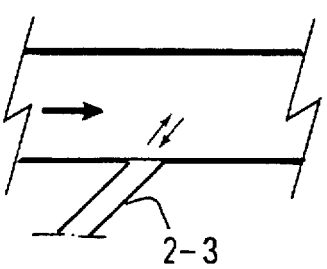
FIG.2D    FIG.2E
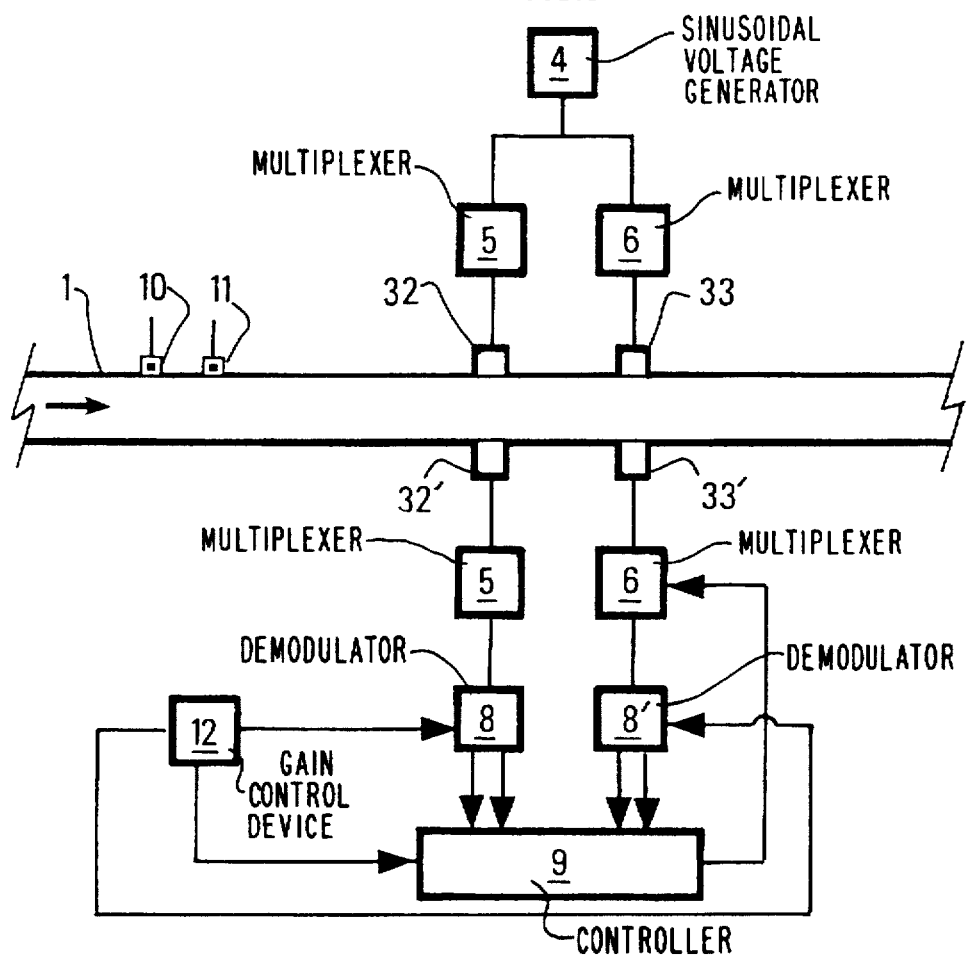
FIG.3

DEVICE AND METHOD FOR MEASURING VELOCITY PROFILES IN A MULTIPHASE FLUID

BACKGROUND OF THE INVENTION

1. Field of the Invention

The present invention relates to a method and to a device for achieving a velocity profile of a flow of fluid comprising at least two distinct phases.

2. Description of the Prior Art

Multiphase fluid flows, notably in the case of petroleum type effluents, have many regime patterns, rapidly variable, which require fast measurement devices and processes. Such devices notably allow obtaining of real time measurements of the velocity of each phase making up this effluent.

A real time measurement of the rate of circulation of a phase allows for example, associated with the knowledge of the quantity of this phase, determination of its real flow rate. For a multiphase effluent comprising for example an aqueous phase, an organic phase and a gas phase, knowledge of the flow rates of each of these phases, determined simultaneously at the outlet of petroleum production wells, is necessary notably for the control and the safety of the collection system transporting the crude effluents towards a separation and/or processing center.

Real time measurement of the rate of circulation also applies to the field of transportation without separation of the phases of a multiphase fluid. In fact, transferring such a fluid for example from a source to a processing location requires in most cases the use of pumping devices whose optimal running is linked to the knowledge of the flow rate of the liquid phase and of the gas/liquid ratio of the fluid.

BACKGROUND OF THE INVENTION

It is well-known from the prior art to carry out velocity measurements by the Doppler effect.

U.S. Pat. No. 4,919,536 thus describes a process allowing obtaining of a velocity field of a fluid comprising a liquid phase and a gas phase by use of the Doppler effect. This patent teaches lighting the fluid with a chromatic light and measurement of the frequency shift of the light wave diffused by the particles included in the fluid, this shift being characteristic of the motion of the particles.

This device is unsuitable for fluids comprising an opaque phase such as those encountered in petroleum effluents, since the light, chromatic or not, is transmitted with great difficulty.

U.S. Pat. Nos. 4,640,292 and 4,680,739 describe devices and processes for measuring the velocity of particles flowing in the blood, by using the Doppler effect in order to determine the velocity of the particles.

The above-mentioned devices are thus well suited for determining the velocity of a flowing phase such as a solid phase or a liquid phase and phases having low opacities. However, they do not allow obtaining the velocity for each of the phases included in a multiphase fluid, whatever the physical characteristics of these phases.

In most cases, the velocity of the gas phase is in fact deduced from the velocity of the liquid phase and from other data such as the quantities of the two phases, and from specific fluid parameters.

Furthermore, the method for processing the signals used in these devices is based on a crosscorrelation of two signals leading to an average velocity value of the fluid.

Besides, the devices of the prior art do not always fully conform to the safety standards required in the petroleum industry on account of the nature of the radiations which are used.

SUMMARY OF THE INVENTION

The object of the present invention is to overcome the above-mentioned drawbacks. It particularly allows determination precisely and rapidly of the velocity of each phase constituting a multiphase fluid, whatever the physical characteristics of the phases.

The invention is particularly well-suited for determining the velocity of a gas phase and the velocity of a liquid phase circulating in a pipe.

When applied to the petroleum field, the present invention allows notably the obtaining of the velocity of an organic phase, an aqueous phase and a gas phase that constitute in most cases a petroleum type multiphase effluent. It is thus possible to obtain the velocity distribution for each of these phases.

The invention also applied to other fields than the petroleum field, such as fields where fluids comprise several phases each of distinct nature for which it is desirable to know the velocity distribution for each of the phases.

What is referred to as velocity field or velocity profile is all of the values that can be taken of a velocity vector of the multiphases in different places, for example, of a pipe in which the multiphase fluid circulates.

The invention is notably applied to obtaining the velocity of each phase contained in a petroleum type effluent and to achieve a velocity field for this effluent.

In the description hereunder, what is referred to as a "disturbed wave" is a wave having at least one characteristic or at least one physical parameter associated thereto, for example the amplitude or the phase which has varied. This variation can result from the encounter of the wave with an obstacle present in a multiphase medium in which it is propagated.

Similarly, the terms "antenna" and "transducer" are used to designate the transmission and/or reception of a wave.

The method according to the present invention allows determination of the velocity of each phase of a multiphase fluid, the fluid comprising at least a liquid phase and a gas phase included in a volume such as a pipe. It is characterized in that it comprises at least the steps as follows:

a) a first wave is emitted at a given frequency f1 selected as a function of the liquid phase and a second phase is emitted at a given frequency f2 selected as a function of the gas phase, then at least one parameter characteristic of part of the first disturbed wave that has crossed the liquid and gas phase of the multiphase fluid is measured in a first place in the pipe and at least one parameter characteristic of at least one part of the second wave that has crossed the fluid is measured in a second place in the pipe.

b) the parameters measured during step a) on the circulating fluid are discriminated from an appropriate processing; and c) from the values of the discriminated parameters, the velocity field of the liquid phase and/or of the gas phase is determined by means of an appropriate processing for a given section of the volume.

It can be chosen to measure parameters such as the amplitude and/or the phase shift of the part of the disturbed wave that has crossed the multiphase fluid.

The first wave can be emitted at a frequency whose value can range between 0.5 and 5 MHz, preferably between 1.5 and 3 MHz, and/or the second wave can be emitted at a frequency whose value can range between 0.1 and 1 MHz.

During step c), a processing based on information frequency processing techniques can be used, such as the autoregression technique or the sliding average autoregression technique; a maximum likehood technique can also be used for determining the velocity of a phase.

For a multiphase medium flowing in a pipe, the parameters of the first disturbed wave are for example measured in several places at a given height of the pipe and the parameters of the second disturbed wave are measured in several places at a given height of the pipe, the first place being close to the second place.

Electromagnetic waves such as microwaves can be transmitted.

The transmitted wave can be an ultrasonic wave.

The present invention further relates to a device allowing measurement of the velocity of each phase of a flowing multiphase medium, the medium comprising at least a liquid phase and a gas phase. It is characterized in that it comprises in combination:

a transmitter suited to the liquid phase so as to transmit a first ultrasonic wave at a first frequency f1 and a receiver suited to the liquid phase for receiving the wave that has crossed the multiphase medium, a transmitter suited to the gas phase so as to emit a second wave in the multiphase medium at a second frequency f2 and a receiver suited to the gas phase for the second wave that has crossed the medium;

means for measuring at least one parameter of the first disturbed wave and at least one parameter of the second disturbed wave after crossing the multiphase medium, means for discriminating the measured parameters; and a processor for processing the discriminated measured parameters so as to deduce directly from the parameters a velocity value associated with the liquid phase and for the gas phase.

Transmitting-receiving antennas and/or transmitting or receiving antennas consisting of a material selected from the group made up of piezoelectric and/or piezocomposite materials can be used as a transmitter.

When measurements are carried out for example in transmission through a multiphase medium, consisting for example of a fluid flowing in a pipe, the transmitter and the receiver are located on either side of the pipe.

When the multiphase medium is a fluid flowing in a pipe, and the diffusion of waves is required, the transmitter and the receiver are positioned for example on the same side of the pipe, preferably close to one another.

The transmitter and receiver can comprise a plurality of elements acting as transmitters and/or receivers.

The method and the associated device are particularly well-suited for determining the velocity field of the liquid phase and of the gas phase of a multiphase fluid comprising at least an aqueous phase, at least a liquid phase and at least an organic phase.

The present invention thus affords many advantages in relation to the processes commonly used in the prior art. In fact, it allows the rapid obtaining precisely of the velocity associated with a phase constituting a multiphase fluid.

It also has the advantage of being nonintrusive.

The speed of the method and of the device allowing the implementation thereof allows real time measurements of the velocities of phases having different velocities. The expression "real time" means that the duration of the measurement is less than the spatial and temporal variation of the multiphase medium, i.e. the velocity variation of the proportions of constituents or phases of different natures constituting this medium.

Another advantage lies in the design of the antennas withstanding pressures of at least 100 bars and temperatures of at least 100° C. and resistant to corrosion and abrasion.

BRIEF DESCRIPTION OF THE DRAWINGS

Other features and advantages of the present invention will be clear from reading the description hereafter given by way of non limitative examples, with reference to the accompanying drawings in which:

FIGS. 2A, 2B, 2C, 2D and 2E schematize several possible examples of the arrangement of the transducers with respect to a pipe in which a multiphase medium circulates; and FIG. 3 shows another embodiment of a device according to the invention comprising transmitting antennas and receiving antennas.

DESCRIPTION OF THE PREFERRED EMBODIMENTS

The method implemented according to the present invention notably uses transducers suited to each of the constituents forming a multiphase medium, i.e. whose nature and geometry allow reliable and precise measurements to be obtained.

It comprises at least a steps during which the measurements of at least one physical parameter of a part of the wave disturbed during its propagation in a multiphase fluid comprising diffusers or impurities are discriminated.

The diffusers can be gas bubbles included in the liquid phases, oil droplets contained in water, water droplets contained in oil or liquid droplets included in the gas phase, or all types of impurities that can be present in the multiphase medium being analyzed, for example may be solid particles.

The measured parameters, for example the amplitude variation of the wave, representative of the nature of the phase crossed, it is possible for example to discriminate the phases according to their nature, notably the liquid phases and the gas phase, for example from this variation.

An associated velocity measurement allows a velocity profile to be achieved for all the phases.

It is thus possible to use part of a wave backscattered during its propagation in a fluid or part of the wave diffused, depending on whether using reflection or transmission. The wave propagated in the fluid can be a mechanical wave, for example a pressure wave such as an ultrasonic wave, or an electromagnetic wave such as a microwave.

The description presented hereafter in connection with the accompanying drawing is particularly well suited for achieving a velocity profile or field for a multiphase fluid such as a petroleum type effluent comprising at least a liquid phase, for example a mixture of water and of oil, and a gas phase.

This effluent can also comprise solid particles such as hydrates and/or sand.

Figure 1:
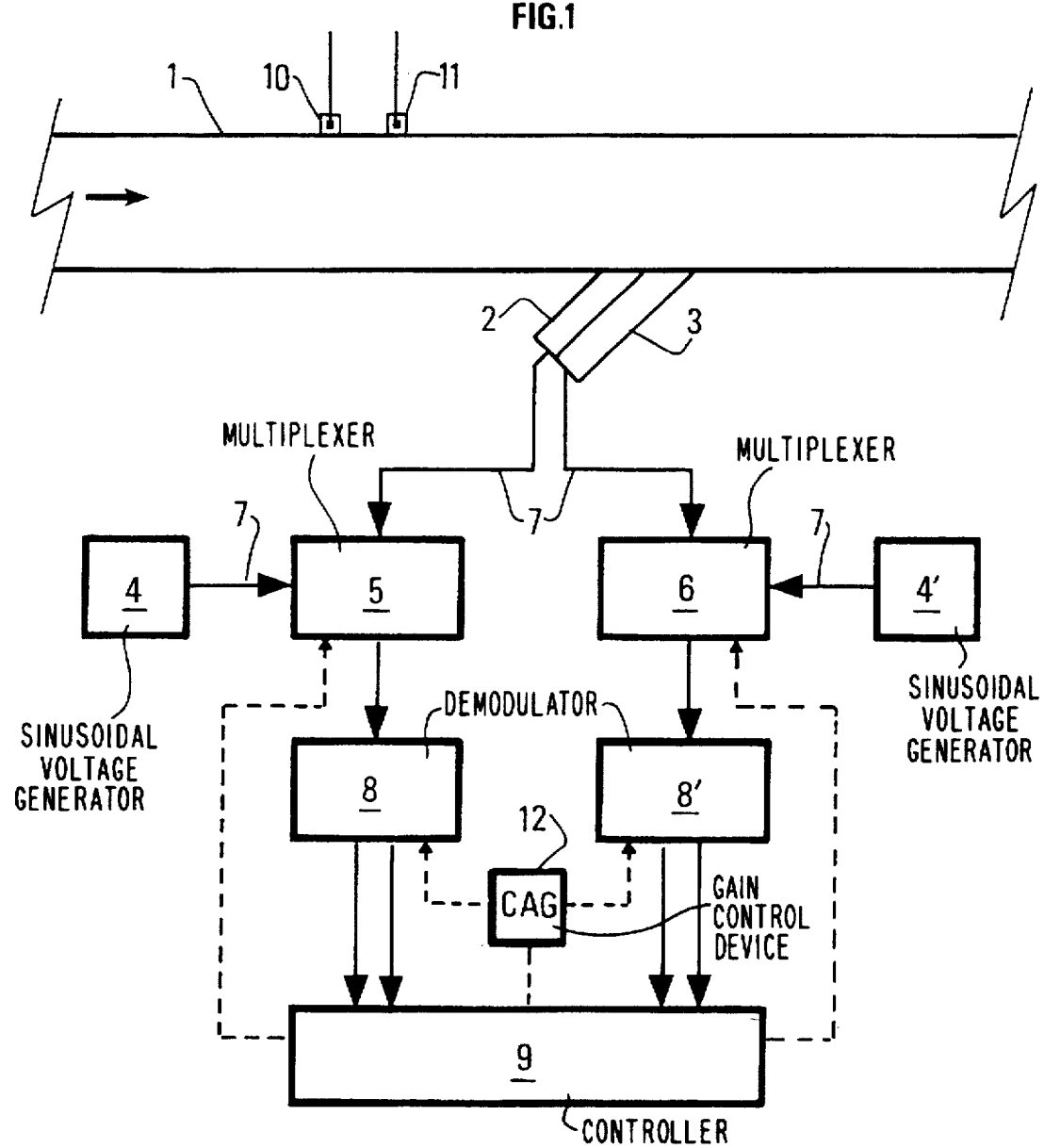
FIGS. 1 and 1A represent an embodiment example of a device according to the invention.
Figure 1A:
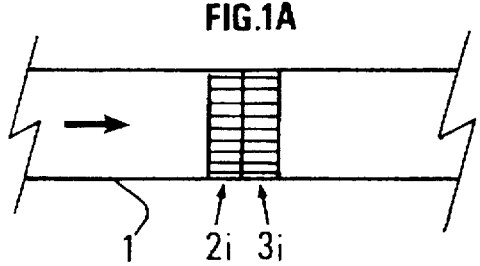

The device described in FIGS. 1 and 1A is a particular example of an implementation of the invention where the wave emitted is an ultrasonic wave, and the part of the measured wave used as a basis for determining the velocity profile is a part of the wave backscattered on a diffuser.

The multiphase fluid flows for example in a pipe 1 of rectangular section, for example, connected to a source of multiphase fluid. Pipe 1 is equipped for example with a transmission-reception antenna 2 suited to the liquid phase of the multiphase fluid and with a transmission-reception antenna 3 suited to the gas phase. Antennas 2 and 3 can have the shape of a bar comprising for example a plurality of elements, respectively $2i$ and $3i$ (shown in FIG. 1A), the first purpose of these elements being notably to emit at least an ultrasonic wave respectively at a first frequency f1 and a second frequency f2, their second purpose being to receive at least part of the ultrasonic wave backscattered on at least one diffuser. The frequency value f1 is determined as a function of the liquid phase so as to adapt the size of the pickups to the device and to obtain the best signal-to-noise ratio of the signal received by the antenna and selected for example in the range between 0.5 MHz and 5 MHz, preferably between 1.5 and 3 MHz. The frequency f2 is selected so as to obtain a good compromise between the sensitivity, the size of the transmitters-receivers or transducers and the best signal-to-noise ratio of the signal received by the antenna suited to the gas phase, and a frequency is selected between 0.1 and 1 MHz and preferably substantially close to 0.7 MHz.

In the embodiment described in connection with FIG. 1, the transmitter-receiver 2 suited to the liquid phase is positioned close to the transmitter-receiver 3 suited to the gas phase, the distance between these two transmitters-receivers being selected for example as a function of the nature and the spatial and temporal variation of the structure of the fluid.

The transmitting-receiving antennas are for example:

a high temperature active material such as a high temperature piezoelectric or piezocomposite material, transferring the electric energy into a mechanical vibration (and vice versa), a front face and a body made for example from an alloy withstanding high pressure conditions of at least equal to 100 bars and the abrasion due to brine and/or to the penetration of gas, a high temperature non-piezoelectric polymer.

Selection of the piezoelectric material, of the polymer, of the thickness and of the nature of the alloy is determined obtain a good sensitivity, i.e. allowing to obtaining a better signal-to-noise ratio of the ultrasonic signal generated during transmission and of the electric signal reproduced during reception, a bandwidth large enough not to filter the spectrum of the "disturbed wave" picked up by the receiver, and a good directivity in order to soundproof a well-defined region of the space.

The elements $2i$ and $3i$ of an antenna, as illustrated in FIG. 1A, are for example positioned one above the other over the height of pipe 1.

Each element 2 and 3 is connected, by a multiplexer respectively 5 and 6, to a sinusoidal voltage generator, respectively 4 and 4'. Each element 2 and 3 generates for example ultrasonic waves at a frequency f1 and f2, the frequencies being selected so as to optimize the signal-to-noise ratio of the signal received by the antennas according to the nature of the phases contained in the multiphase fluid.

The purpose of multiplexers 5 and 6 is notably to direct the electric signal transmitted by the source towards an element 2, 3 of a transmitting-receiving antenna. Transmission of these waves is achieved by conventional electric links 7.

The ultrasonic waves are transmitted at the frequencies f1 and f2 through the multiphase fluid in which they are at least partly backscattered by the impurities or diffusers, and the backscattered signal has the form of one or several pressure waves picked up by the receiving part of antennas 2 and 3, particularly by each one of the elements $2i$ and $3i$ acting as receivers. These elements $2i$ and $3i$ convert a pressure wave into an electric signal. This signal is transmitted by means of conventional electric links 7, on the one hand from the various elements $2i$ of the transmitting-receiving antenna 2 to multiplexer 5, then to a reception and demodulation device 8, and on the other hand from the various elements $3i$ of the transmitting-receiving antenna 3 to multiplexer 6, then to a reception and demodulation device 8'. The purpose of devices 8 and 8' is notably to demodulate the signals and to transmit the demodulated signals to a controller 9. The controller 9 has various functions, which notably consist in managing the transmission and the reception of the pressure waves or acoustic waves, processing the data and the information received, generating itself signals allowing the various devices to be controlled and controlling the various stages of the method described hereafter.

Controller 9 can be a microcontroller equipped with a signal acquisition and generation card, and with appropriate software allowing notably the signals received by the antenna elements to be analyzed in order to determine the velocity profile of the fluid in real time.

Controller 9 notably receives the demodulated signals from devices 8 and 8', and the signals from the temperature 10 and pressure 11 detectors. These detectors record the thermodynamic conditions under which the measurements are achieved, to permit the performing of corrections on the intrinsic parameters taken into account for achieving the velocity profile.

Controller 9 can also supply the values of the initial parameters relative to the transmitted waves and all the parameters necessary for processing the data.

A gain control device (CAG) 12 controlled for example by controller 9 can be positioned after multiplexers 5 and 6. Its purpose is to adapt the amplitude of the signals sent to the demodulator receivers 8 and 8'. The gain control can be automatic or controlled according to the level of the demodulated signals, by means of the controller.

The transmitting-receiving antenna that is suited to the nature of the liquid phase of the multiphase fluid is a specific antenna which can be used in particularly difficult conditions (high temperatures, high static pressure, high corrosion and abrasion). This antenna can comprise a front face material having a specific geometric shape allowing avoidance of the presence of a cavity due to the inclination of the antenna. This allows the transmission of the ultrasonic beam in the fluid to be optimized.

Similarly, the transmitting-receiving antenna 3 suited to the gas phase is made from a material withstanding the "toughened" conditions of use (pressure at least equal to 100 bars, and temperatures at least equal to 100° C.), while having acoustic specifications such as a sufficient sensitivity to detect with the receiving transducers $3i$ a backscattered signal having a sufficient dynamic range, a sufficient passband, a good directivity in order to avoid a direct coupling between the transmitter-receiver in case of a transmission connection.

Antennas 2 and 3 consist for example of a flat antenna with an inclined lobe or of an antenna having for example a transmission lobe perpendicular to the plane of propagation of the emitted wave, the antenna being then inclined with respect to the pipe as shown in FIGS. 2A, 2B, 2C, 2D and 2E. These antennas to act as a transmitter-receiver or as a transmitter or as a receiver.

The ultrasonic waves can also be emitted from a single source whose frequency is varied, the frequency values being selected as stated above.

One way of implementing the method according to the invention is for example in carrying out the steps as follows:

When the multiphase fluid is flowing in pipe 1, microcontroller 9 sends a control signal to multiplexers 5 and 6 so that all the elements 2$i$ of transducer 2 transmit a first ultrasonic wave at a frequency f1 to the fluid flowing in the pipe, and all the elements 3$i$ of transducer 3 transmit a second ultrasonic wave at a frequency f2 to the fluid.

Microcontroller 9 manages this ultrasonic wave transmission sequence in different ways as described briefly hereafter.

It can for example drive multiplexers 5 and 6 in order to obtain a sequential emission of the wave at the frequency f1 and thereafter of the wave at the frequency f2, i.e. one after the other. The first wave f1 is thus transmitted by means of multiplexer 5 from a first element of transducer 2, then it passes to a second element and up to a last element n of transducer 2. The second wave f2 is then transmitted from a first element of transducer 3 by means of multiplexer 6, and so on up to the last element n of transducer 3.

The rate at which the transmitting elements 2$i$ and 3$i$ of the antennas are activated one after the other and at which the receiving elements 2$i$ and 3$i$ of the antennas are scanned is fast enough in relation to the evolution of the structure of the fluid that it is possible to obtain information on a fluid whose structure is assumed to be stable in time and in space.

The controller a can also manage the transmission of the waves simultaneously. To that effect, it commands simultaneously the elements of rank i of each of the antennas 2 and 3, then the elements i+1, and so forth, up to the last element n of the antennas, to emit the waves f1 and f2 and at the same time, it controls simultaneously multiplexers 5 and 6.

The ultrasonic waves f1 and f2 transmitted to the multiphase fluid through elements 2$i$ and 3$i$ towards the multiphase fluid are propagated in a direction forming a given angle with respect to the direction of flow of the multiphase fluid and they are diffused for example at least partly by diffusers (impurities) present in the liquid phases and in the gas phase.

The receiving elements 2$i$ and 3$i$ of the antennas receive the pressure waves backscattered by the impurities and transmit these signals through multiplexers 5 and 6 respectively to the demodulator receivers 8 and 8'. These signals contain information relative to the nature of the phase traversed by the wave and to its velocity of flow.

The demodulator receivers perform a demodulation and a synchronous detection of the signals received by the receiving elements of the antennas by combination, for example, with reference signals received with the signals respectively transmitted from the ultrasonic waves encountering impurities, in a way that is well-known, and by means of appropriate devices that allow notably eliminatation of possible coupling components that may appear between the antenna elements as a result of the high frequency values.

Signals containing information on the velocity of a phase by means of the amplitude and the phase shift of the part of the wave backscattered by an impurity and taking into account the direction of flow of the fluid are obtained at the output of the demodulator receivers.

The demodulated signals are then transmitted to controller 9 which performs several processings. To that effect, the microcontroller is programmed and comprises for example in its memory reference parameters such as the initial values of the amplitudes and of the phases of the ultrasonic waves emitted, and threshold values allowing the different signals to be discriminated.

At first, the microcontroller analyzes for example the amplitude of the signals coming from the demodulator receivers 8 and 8' and relative to the antenna elements 2$i$ and 3$i$. It retains the values indicative of the backscattered parts of the first wave of frequency f1 and of the second wave of frequency f2, by comparing for example the amplitude of a signal with two predetermined threshold values I1 and I2. It performs this comparison for example for each signal and stores, when the comparison operation is completed, the amplitude values sorted thereby, the associated amplitude value and the rank of the element i of the transducer concerned. The values can also be stored as they are compared.

The threshold values are for example determined as a function of the nature of the phases of the multiphase fluid and according to the nature of the transmitted wave.

From the relative phase shift between the transmitted and backscattered frequencies, the microcontroller determines the velocity of the phase measured from the conventional relation connecting the velocity to the frequency deviation due to the Doppler effect.

$$V = \frac{F_d C_o}{2F_e \cos \alpha}$$

where V is the velocity of the phase
Fd=Doppler frequency deviation
α=angle formed by the transmitted and reception beam with the direction of flow of the multiphase fluid
Fe=emission frequency of the wave
Co=velocity of propagation of the wave in the multiphase fluid, determined for example by a measurement per time of transit performed for each complete sequence.

Knowing the rank i of the antenna element, the nature of the phase relative to an amplitude value and the value of the velocity, the controller a determines, for a given place in the pipe associated with an antenna element, the velocity of each of the phases and thus deduces therefrom the velocity profile associated with the multiphase fluid.

The controller 9 is programmed for an ultrasonic wave so as to discern the values corresponding to the part of the wave of frequency f1 backscattered by the impurities included in the liquid phase or phases and the amplitude values corresponding to a part of the wave of frequency f2 backscattered by the impurities included in the gas phase. It is thus capable of associating with an amplitude value a phase nature constituting the multiphase fluid. It is also possible, in some cases, to discriminate liquid phases of different natures by using subdivided threshold values.

In fact, when ultrasonic waves are used, the amplitude of the signal diffused by the impurities included in the aqueous phase such as water is close to the amplitude of the signal reflected by impurities included in the organic phase, whereas these two amplitudes are far enough from the amplitude of the signal reflected by impurities included in the gas phase.

By means of an appropriate selection of threshold values, the controller 9 distinguishes the signals coming from the diffusion of the ultrasonic wave by impurities included in a liquid phase or in a gas phase.

In order to determine the velocity, the controller 9 can perform a temporal information processing by means of autocorrelation techniques, or implement information frequency processing techniques such as the autoregression technique, or the sliding average autoregression technique, or a maximum likehood technique for determining the velocity of a phase.

These processings allow the obtaining of a good assessment of the Doppler frequency, even for low values of the signal-to-noise ratio.

The different calculations applied for determining the nature and the velocity of a phase are for example performed with respect to the initial parameters associated with the ultrasonic waves emitted at the frequencies f1 and f2, the parameters retained in the method described above being for example the amplitude and the phase.

The values I1 and I2 used in the threshold method described above can be previously determined from multiphase fluids circulating in a pipe, for example, in which an ultrasonic type wave is emitted. The composition of the fluid and the proportion of each phase contained in the fluid being known, it is thus possible to generate a model associating the nature of a phase of the fluid with an amplitude value, that is stored in the controller 9.

The threshold values can be advantageously refined so as to be able the discrimination of the different liquids constituting the liquid phase contained in the multiphase fluid.

These models can be developped from a petroleum type multiphase fluid comprising for example a liquid aqueous phase, a liquid organic phase and a gas phase.

Another way of discriminating the nature of the phases is using the neural network classifiers commonly used in the telecommunications field.

FIGS. 2A, 2B, 2C, 2D and 2E schematize various antenna layouts with respect to the pipe 1.

FIGS. 2A and 2B relate to antennas used as a transmitter (32', 33'; 32, 33) or as a receiver and they are for example used for measurements obtained in transmission, i.e. the method used in this case exploits a part of a wave diffused by an impurity. Such an antenna comprises for example at least one transmission lobe perpendicular to the transmission face and it forms an angle of inclination with respect to the axis of the pipe, the angle being substantially equal to the angle formed by the direction of propagation of the ultrasonic waves with the direction of propagation of the fluid. This angle can vary within a range between 30° and 60° and it is selected so as to optimize the signal received by the receivers coupled to the transmitters.

The space included between a transmitter, or a receiver, and the pipe is filled with a material of a type preferably identical to that constituting the material of the transmitter or of the receiver. The losses observed during the transmission of the beam of ultrasonic waves in the fluid circulating in the pipe are minimized thereby.

Such a layout also allows the signal-to-noise ratio to be optimized by minimizing the direct acoustic path between the transmitter and the receiver like the example in FIG. 2C.

Another possibility schematized in FIG. 2B relative to a device working in transmission is using antennas having a single inclined lobe on account of their design. Such a type of antenna can thus be positioned without an inclination of the antenna with respect to the axis of the pipe. Such a layout leads to a saving of space, to a signal gain and to a more reliable mechanical fastening. In fact, the beam of ultrasonic waves emitted by the inclined lobe of the antenna is already directional and its direction of emission is selected so as to improve the signal-to-noise ratio.

FIG. 2C is a variant of FIG. 2A in which the axis of a transmitter is in line with the axis of the corresponding receiver.

FIGS. 2D and 2E relate to transmitting-receiving antennas (2, 3) used for example in the device described in connection with FIG. 1, which exploit a backscattered part of the wave. FIG. 2D shows a transmitting-receiving antenna of the flat antenna type with an inclined lobe emitting a beam of waves in a determined direction, the direction of transmission forming an angle ranging for example between 30° and 60°.

Another possibility is in tilting the transmitter-receiver with respect to the axis of the pipe as shown in FIG. 2E and in filling the space contained between the face of the transmitter and the pipe with a material preferably identical to the materials constituting the antenna.

The six possible ways of positioning the antennas with respect to the pipe described above apply to the antennas suited either to the liquid phase or to the gas phase, whatever the type of radiation used.

Another example of embodiment of the device according to the invention is shown for example in FIG. 3. The difference between such a device and the embodiment example described in connection with FIG. 1 mainly relates to the use of antennas fulfilling the role of either a transmitter or a receiver. The term transmitter is used to designate an antenna whose purpose is to transmit a wave and the word receiver refers to an antenna whose purpose is to receive at least part of the transmitted wave that has traversed the multiphase medium.

The device includes a transmitter 32 suited to the liquid phases and a transmitter 33 suited to the gas phase, transmitters 32 and 33 being positioned on one side of the pipe and preferably close to one another. Transmitter 32 is associated with and for example placed opposite a receiver 32' on the other side of the pipe and inclined with respect to the pipe, at an angle whose value is selected so as to optimize the reception of the signals coming from the parts of the ultrasonic waves diffused on the diffusers and transmitted to the receiver.

According to a similar layout, a receiver 33' suited to the gas phase is positioned with respect to transmitter 33.

Receiver 32' is for example connected to multiplexer 5 and receiver 33' is connected to multiplexer 6. These multiplexers are connected, as described in FIG. 1, respectively to demodulator receivers 8 and 8', which are themselves connected to microcontroller 9.

The other elements of the device and their connections are identical to those described in FIG. 1 and are therefore not detailed here.

The type, nature and geometry of transmitters 32, 33 and receivers 32', 33' are identical to those of transmitters-receivers 2 and 3 and comprise for example several elements identified by a rank i. These elements are for example n in number, this number being identical for the transmitters and the receivers.

The implementation of the method according to the invention by means of such a device is identical to that described in connection with FIG. 1.

The antennas 32, 33, 32' and 33' used in this embodiment for example can also have bars of elements fulfilling the function of transmitter and receiver similar to those described in connection with FIG. 1, by configuring them either for a transmitting or a receiving function.

Without departing from the scope of the invention, the measuring device according to the invention can also be placed on a pipe whose section is circular for example, or whose geometry is different from that described above.

It is also possible to calculate the velocity of the phases by applying a measurement of the time of transit between two antennas or transducers, as it is well-known.

We claim:

1. A method for measuring velocity of at least a liquid phase and a gaseous phase of a flowing multiphase medium comprising the steps:

transmitting through at least part of the multiphase medium a first wave at a given frequency f1 selected as a function of the liquid phase and receiving the first wave disturbed by the flowing medium;

transmitting through at least part of the multiphase medium a second wave at a given frequency f2 selected as a function of the gaseous phase and receiving the second wave disturbed by the flowing medium; and processing the received first and second waves using a relationship defining the Doppler effect to determine a velocity field of the liquid phase and the gaseous phase for different places of a section of the flowing multiphase medium.

2. A method as recited in claim 1 wherein:

the received first and second waves contain an amplitude and/or a phase shift produced by the flowing medium.

3. A method as recited in claim 1 wherein:

the first wave is transmitted at a frequency ranging between 0.5 and 5 MHz and the second wave is transmitted at a frequency ranging between 0.1 and 1 MHz.

4. A method as recited in claim 3 wherein:

the first wave is transmitted at a frequency ranging between 1.5 and 3 MHz.

5. A method as recited in claim 1 wherein:

the processing of the received first and second waves uses one of an autoregression, a sliding average autoregression, or a maximum likelihood technique for determining a velocity of a phase.

6. A method as recited in claim 1 wherein:

the multiphase medium is flowing in a pipe having the section, the at least one parameter of the first wave is measured at several points at a given height of the pipe in a first place and at least one the parameter of the second wave is measured at several points located at a given height of the pipe in a second place.

7. A method as recited in claim 1 wherein:

ultrasonic waves are transmitted.

8. A method as claimed in claim 1 wherein:

microwaves are transmitted.

9. A device for measuring velocity of each phase of a flowing multiphase medium having at least a liquid phase and a gaseous phase comprising:

a transmitter, selected for the liquid phase, for transmitting a first ultrasonic wave at a first frequency f1 selected as a function of the liquid phase at least partially through the flowing multiphase medium and a receiver, selected for the liquid phase, for receiving the first ultrasonic wave that has at least partially been transmitted through the multiphase medium;

a transmitter, selected for the gaseous phase, for transmitting a second ultrasonic wave in the multiphase medium at a second frequency f2 selected as a function of the gaseous phase at least partially through the flowing multiphase medium and a receiver, selected for the gaseous phase, for receiving the second ultrasonic wave that has at least partially been transmitted through the multiphase medium; and a processor, coupled to the receiver, for processing the received first and second ultrasonic waves using a relationship defining the Doppler effect to determine a velocity field associated with the liquid phase and the gaseous phase for different places of a section of the flowing multiphase medium.

10. A device as recited in claim 9 wherein:

the transmitters comprise a material selected from a group of piezoelectric and/or piezocomposite materials.

11. A device as recited in claim 9 wherein:

the multiphase medium is a fluid flowing in a pipe and the transmitters and the receivers are positioned on either side of the pipe.

12. A device as claimed in claim 9 wherein:

the multiphase medium is a fluid flowing in a pipe and the transmitters and the receives are positioned on a same side of the pipe.

13. A device as claimed in claim 9 wherein:

the transmitters and receivers comprise a plurality of elements each acting as a transmitter and/or receiver.

14. The method as claimed in claim 1 wherein:

the multiphase fluid comprises an aqueous phase, a liquid phase and an organic phase.

15. The method as claimed in claim 14 wherein:

the multiphase fluid is a petroleum effluent.

* * * * *